United States Patent [19]
Elliott

[11] Patent Number: 5,666,811
[45] Date of Patent: Sep. 16, 1997

[54] CLOSURE DEVICES FOR MOTOR VEHICLE MASTER CYLINDERS

[76] Inventor: Colin Elliott, 308 W. 8th Ave., New Westminster, B.C., Canada, V3L 1Y2

[21] Appl. No.: 611,615

[22] Filed: Mar. 8, 1996

[51] Int. Cl.$^6$ ............... F15B 7/00; F01B 29/00
[52] U.S. Cl. ............................ 60/583; 92/161
[58] Field of Search ............... 92/161; 60/533, 60/583, 585

[56] References Cited

U.S. PATENT DOCUMENTS

| | | | |
|---|---|---|---|
| 612,449 | 10/1898 | Wilkinson et al. | 92/161 |
| 4,305,389 | 12/1981 | Potter | 92/161 X |
| 4,489,556 | 12/1984 | Komorizomo | 92/161 X |
| 4,505,112 | 3/1985 | Nakamura | 60/585 X |

OTHER PUBLICATIONS

Bleeder Harness "Brake & Frontend", Jun. 1978, p. 35.

*Primary Examiner*—Hoang Nguyen
*Attorney, Agent, or Firm*—Brian M. Long

[57] ABSTRACT

A closure device for use with a motor vehicle master cylinder has a closure member and a retainer arrangement for securing the closure member on the master cylinder. The retainer arrangement comprises a elongate retainer, a first anchor member for securing one end of the elongate retainer relative to the closure member and a second anchor member adjustably engageable with the elongate member for securing the elongate member to the closure member, with the elongate member extending beneath the master cylinder for retaining the closure member on the master cylinder. To facilitate installation without requiring an installer to reach beneath the master cylinder, the elongate member is made of a material which is sufficiently rigid to be self-supporting in a cantilever condition when gripped at a spacing from a free end thereof, the elongate member being sufficiently flexible to wrap beneath the master cylinder when secured by the anchor members.

2 Claims, 3 Drawing Sheets

CLOSURE DEVICES FOR MOTOR VEHICLE MASTER CYLINDERS

BACKGROUND OF THE INVENTION

1. Field of the Invention

The present invention relates to closure devices for use with motor vehicle master cylinders and, more particularly, to closure devices which are intended to be temporarily secured in position on a top opening of a master cylinder during bleeding of a hydraulic system of which the master cylinder is a part.

2. Description of the Related Art

In the past, closure devices for temporary attachment to the master cylinders of motor vehicles have usually comprised a closure member adapted to fit over and to seal an opening in the top of a master cylinder, the closure member being provided with a nipple for attachment of a hydraulic line, and a retainer arrangement for securing the closure member in position on the master cylinder opening. This closure arrangement has comprised a chain or an elastic cord, which is secured to opposite lateral edges of the retainer member and which extends therefrom beneath the underside of the master cylinder, when in use, so as to pull the closure member downwardly onto the master cylinder.

During the installation of such a prior art closure device, the chain or cord is normally secured at one end to one lateral edge of the closure member, and the closure member is then placed on the master cylinder, with the chain or cord dangling down one side of the master cylinder. The person installing the closure device then reaches down past the opposite side of the master cylinder, and passes his hand beneath the master cylinder so as to grip the free end of the chain or cord, which is then pulled beneath the master cylinder and up past the opposite side of the master cylinder so that it can be secured to the opposite lateral edge of the closure member.

In modern motor vehicles, however, the various components of the engine and other nearby components of the vehicle, including the master cylinder of the hydraulic system, are packed much more closely together than was the case in the past. There is consequently much less space available to provide access for insertion of a hand downwardly and underneath the master cylinder than was the case with old fashioned engines, and modern vehicles have therefore made the task of securing a closure member onto a master cylinder considerably more difficult than previously.

BRIEF SUMMARY OF THE INVENTION

According to the present invention, there is provided a closure device for use with the motor vehicle master cylinder which has a closure member and a retainer arrangement for securing the closure member on the master cylinder, the retainer arrangement comprising a pair of anchor members for securing an elongate retainer to the closure member with the elongate retainer extending beneath the master cylinder. To facilitate the installation of the closure device, the retainer member is made of a material which is sufficiently rigid to be self-supporting, in a cantilever condition, when gripped at a spacing from an end of the elongate member.

Consequently, the elongate member can be passed down one side of the master cylinder, and then gripped, at that side of the master cylinder, or slightly below that side of the master cylinder, by the installer's hand. The free end of the elongate member can then be raised, in the manner of a cantilever arm, so as to enable the free end to be poked past the underside of the master cylinder to the opposite lateral side of the master cylinder, where it can be gripped by the other hand of the installer and pulled upwardly for attachment to the closure member. It is therefore not necessary for the installer to be able to pass his hand beneath the master cylinder.

BRIEF DESCRIPTION OF THE DRAWINGS

The present invention will be more readily apparent from the following description thereof when taken in conjunction with the accompanying drawings, which illustrate a preferred embodiment of the invention, and in which.

DESCRIPTION OF THE PREFERRED EMBODIMENT

Figure 1:
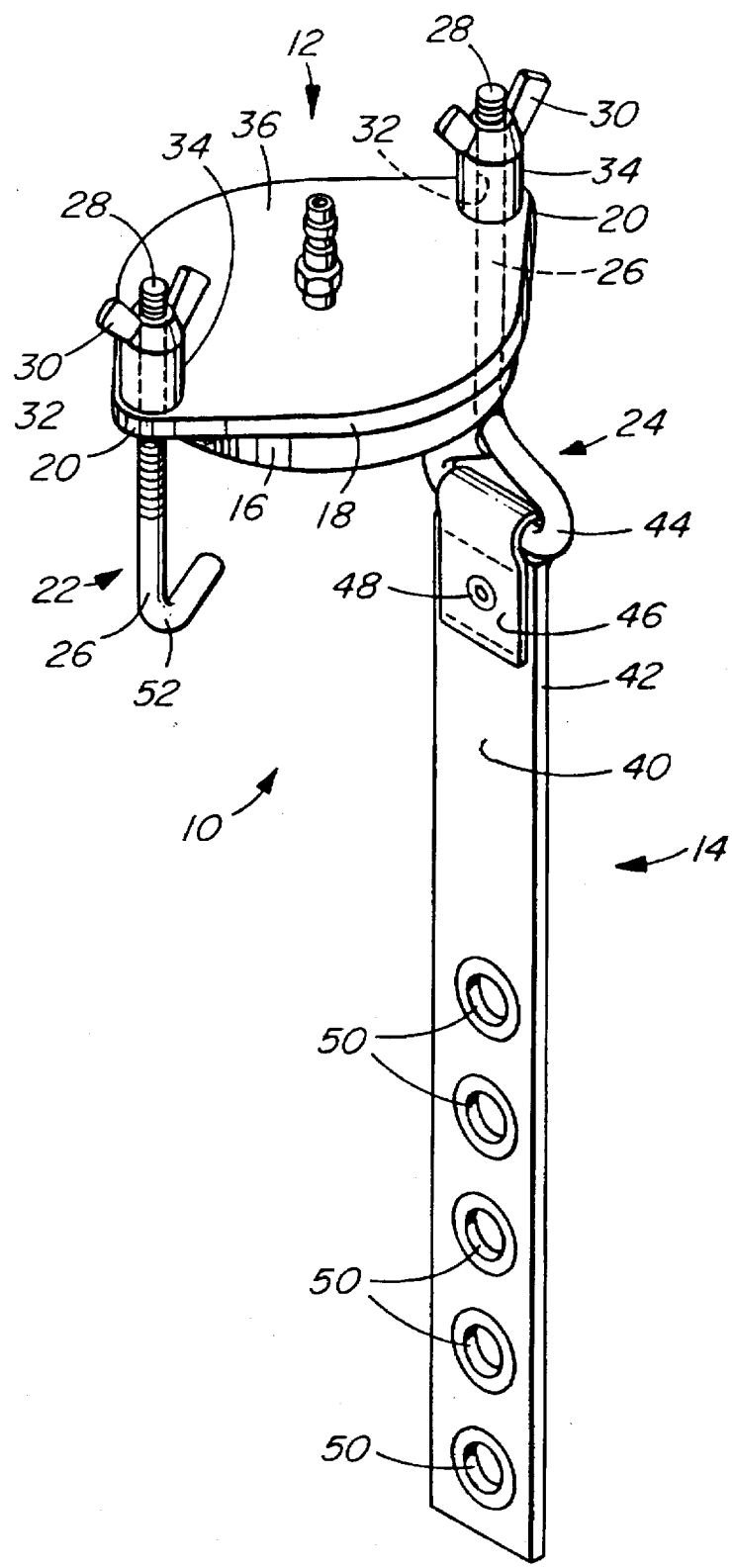
FIG. 1 shows a view in perspective of a master cylinder closure device.

In FIG. 1 there is illustrated a master cylinder closure device indicated generally by reference numeral 10, which comprises a closure member indicated generally by reference numeral 12 and an elongate retainer indicated generally by reference numeral 14.

The closure member 12 comprises a circular rubber gasket 16, which is provided at the underside of an aluminum upper portion 18.

The upper portion 18 projects beyond the periphery of the gasket 16 and is formed, at opposite lateral edges of the closure member 12, with laterally projecting lugs or flanges 20.

A pair of anchor members indicated generally by reference numerals 22 and 24 extend vertically through openings (not shown) in the flanges 20. The anchor members 22 and 24 each comprise a stem 26, which has a threaded upper portion 28 in threaded engagement with a respective wing nut 30. The threaded upper portions 28 of the stems 26 extend slidably through cylindrical openings 32 formed in cylindrical stem supports in the form of plastic bushes 34, which are in threaded engagement in openings (not shown) in the closure member top portion 18 and project upwardly from a flat top surface 36 of the top portion 18. The bushes 34 could alternatively be press-fitted into the top portion 18.

The retainer 14 is formed as a strap 40, which, in the present embodiment of the invention, is made of commercially available industrial p.v.c. belting material. The strap 40 is secured at a first end portion 42 thereof to the anchor member 24. More particularly, the lower end of the anchor member 24 is bent to form an eye 44, and a strip of plastic retaining material 46 is inserted through the opening of the eye 44 and secured to the strap end portion 42, at opposite sides of the strap 40, by means of a rivet 48. The plastic retaining material 46 could be replaced by a metal clip (not shown).

A second or free end portion 60 of the strap 40, opposite from the first end portion 42, is provided with a plurality of openings defined by metal eyelets 50, which are spaced apart along the second end portion 60.

The anchor member 22 has its lower end a hook-shaped end portion 52, which is engageable in anyone of the eyelets 50.

Figure 3:
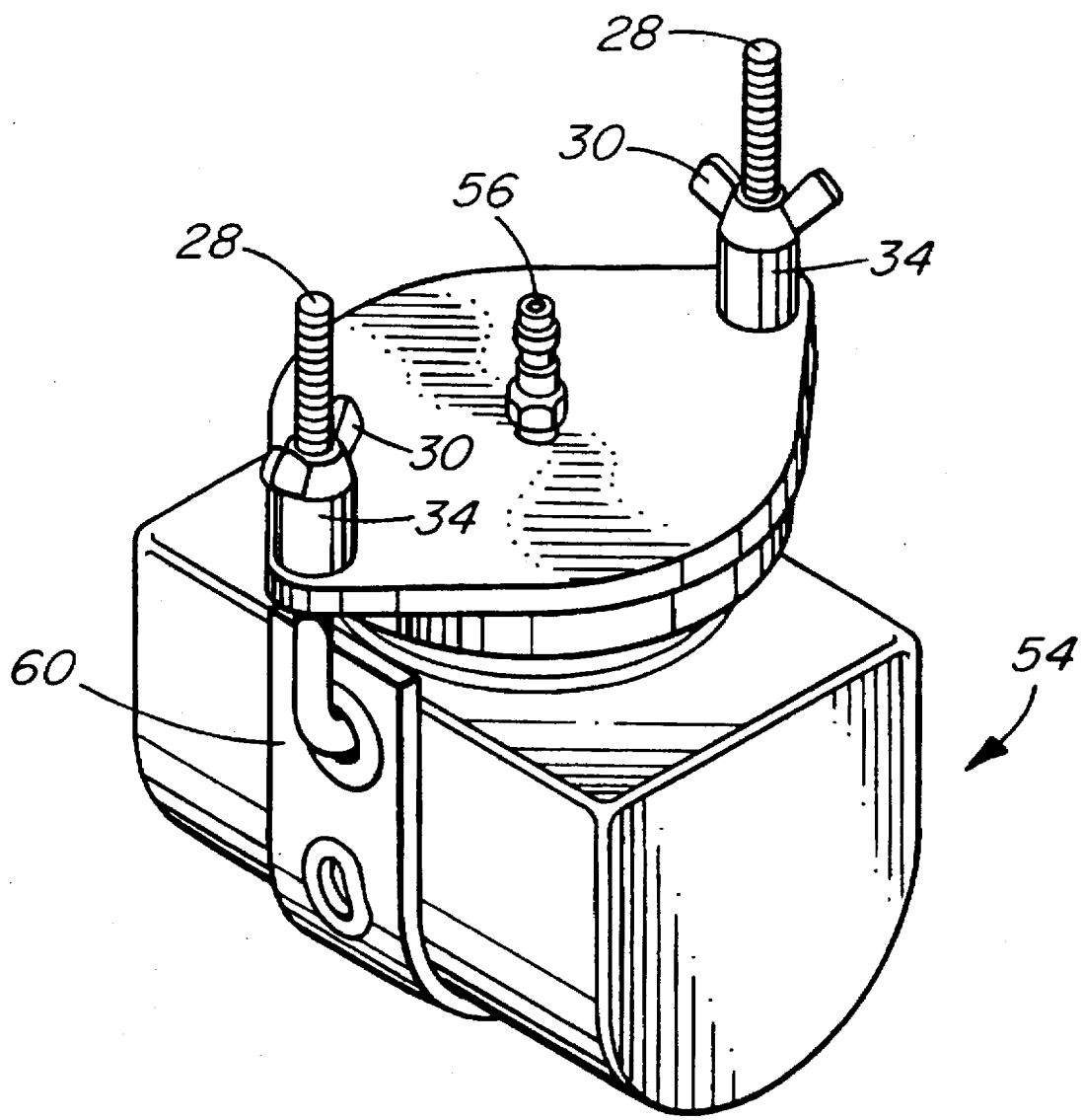
FIG. 3 shows a view in perspective of the closure device of FIGS. 1 and 2 after its installation on the master cylinder.

In use, as shown in FIG. 3, the hook-shaped end portion 52 is inserted into one of the eyelets 50 with the strap 40 extending from opposite lateral edges of the closure member 22 beneath the underside of a master cylinder indicated generally by reference numeral 54, the strap 40 being tightened against the master cylinder 54 by tightening of the wing nuts 30 on the stem upper threaded portions 28.

The closure member 12 is provided, at its middle, with a nipple 56 for use in bleeding the motor vehicle hydraulic system. The bleeding operation is well known in the art and, therefore, is not further described herein.

Figure 2:
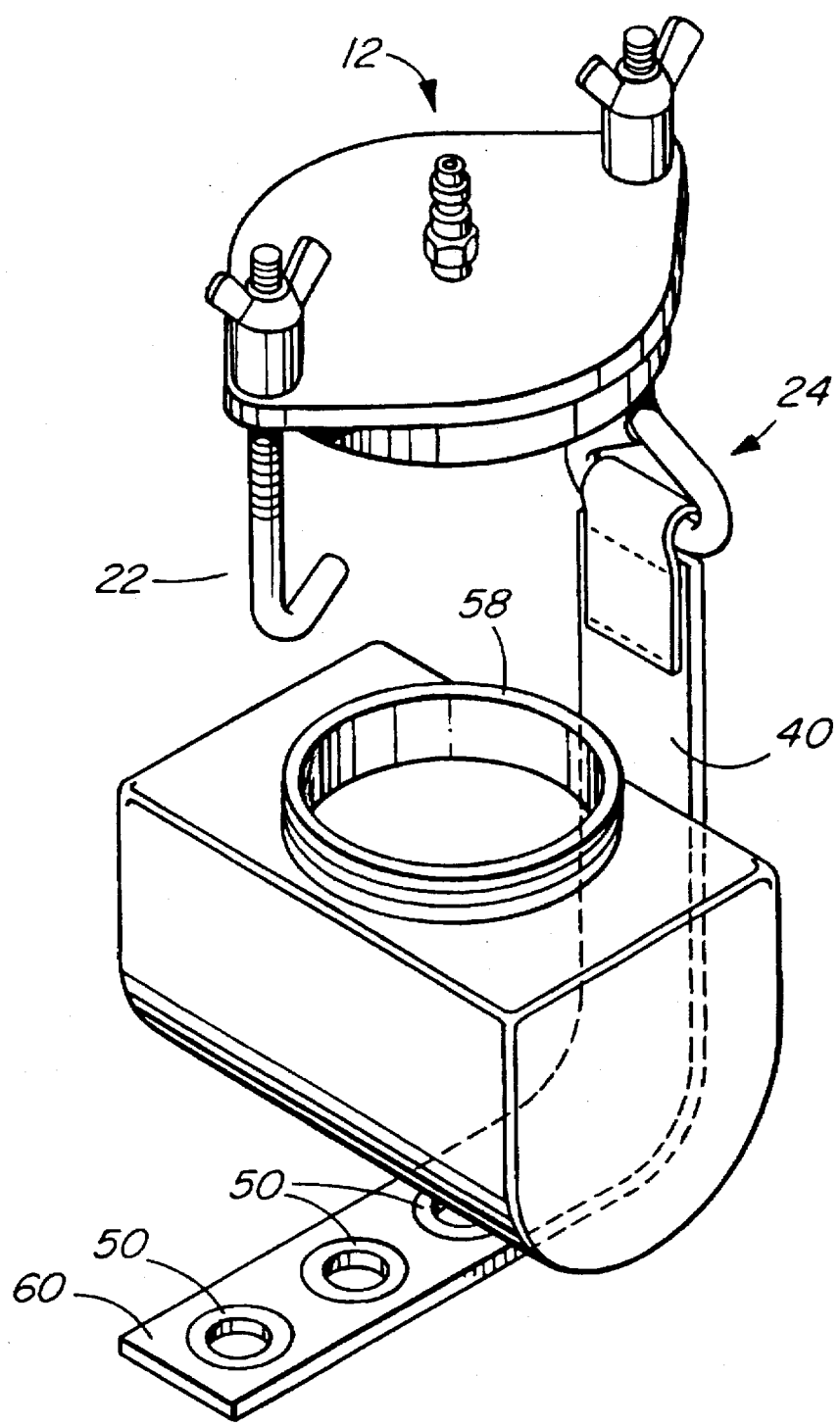
FIG. 2 shows a view in perspective of the closure device of FIG. 1 during installation on a motor vehicle master cylinder.

FIG. 2 shows a stage in the installation of the closure device 10 on the master cylinder 54.

More particularly, as shown in FIG. 2, the closure member 12 is being lowered onto a top opening 58 of the master cylinder 54 for closing the opening 58. The strap 40 has been lowered past one side of the master cylinder 54 and has then been bent, by means of a hand located at this side of the master cylinder 54, so as to extend horizontally, in cantilever fashion, from the hand, which is not shown in the drawings, and in the manner illustrated in FIG. 2, so that the free end of the strap 40 can be poked or otherwise inserted beneath the master cylinder 54 without requiring either hand of the installer to be passed beneath the master cylinder 54. The installer's other hand is then passed downwardly past the other side of the master cylinder 54 so as to grip the free end portion of the strap 40, which is indicated generally by reference numeral 60 in FIG. 2, so that this free end portion 60 can then be drawn upwardly to enable the anchor member hook portion 52 to be inserted into one of the eyelets 50.

It will be apparent, therefore, that the stiffness of the material of the strap 40 is sufficient to enable the free end portion 60 of the strap 40 to be self-supporting, i.e. to maintain an approximately horizontal portion, in a cantilever fashion, while the strap 40 is manually grasped at a location beyond the free end portion 60 and closer to the first end portion 42. This enables the free end portion 60 of the strap 40 to be poked in a substantially horizontal direction between the under-side of the master cylinder 54 and obstructions (not shown) located at a relatively small spacing below the under-side of the master cylinder 54.

After the anchor member hook-shaped end portion 52 has been engaged in one of the eyelets 50, as described above, the wing nuts 30 are tightened so as to raise the anchor member stem portions 26 upwardly through the closure members 12, thereby tightening the strap 40 upwardly against the under-side of the master cylinder 54.

During this tightening operation, the stem supports 34, which fit slidably but relatively closely around the anchor member stems 26, keep the stems 26 in vertical orientations, i.e. at right angles to the flat top surface 36 of the closure member 12, so that the tension in the strap 40 does not twist the stems 26 into an inclination relative to the closure member top 36.

As will be apparent to those skilled in the art, various modifications may be made within the scope of the invention as defined in the appended claims.

For example, the strap need not be anchored directly to the closure member 12, as in the above-described embodiment, but may alternatively be anchored, for example, to a metal strip or the like extending over the closure member, to enable the retainer device to be adapted for use with master cylinders having shapes other than that of the master cylinder 54 illustrated in the drawings.

I claim:

1. A closure device for use with a motor vehicle master cylinder, comprising:

a closure member; and a retainer arrangement for securing said closure member on the master cylinder;

said retainer arrangement comprising an elongate retainer, said elongate retainer having first and second end portions, first and second anchor members for securing said first and second end portions of said elongate retainer relative to said closure member, with said elongate retainer extending beneath the master cylinder for retaining said closure member on said master cylinder;

said elongate retainer comprising a material which is sufficiently rigid to enable said second end portion to be self-supporting in a cantilever condition and in a substantially horizontal orientation when said elongate retainer is gripped beyond said second end portion, and being sufficiently flexible to wrap beneath the master cylinder when secured by said anchor members; and said first and second anchor members each comprising a stem extending through said closure member, said stems each having threaded upper end and a lower end which is shaped for engagement with said elongate retainer, a pair of nuts in threaded engagement with said upper ends for tightening said elongate retainer relative to the master cylinder and a pair of stem supports on said closure member, said stem supports defining cylindrical openings slidably receiving respective ones of said stems for maintaining said stems in predetermined orientations relative to said closure member on tightening of said nuts.

2. A closure device as claimed in claim 1, wherein said second end portion of said elongate retainer is provided with a plurality of eyelets spaced apart along said second end portion thereof, and said second anchor member has a hook-shaped end portion engageable in said eyelets.

* * * * *